United States Patent [19]

Spicer

[11] Patent Number: 4,932,756

[45] Date of Patent: Jun. 12, 1990

[54] DISPLAY CHARACTER

[75] Inventor: David J. Spicer, Hampshire, Great Britain

[73] Assignee: Brookes & Gatehouse Limited, United Kingdom

[21] Appl. No.: 197,219

[22] Filed: May 23, 1988

[30] Foreign Application Priority Data

May 21, 1987 [GB] United Kingdom ............... 8712064

[51] Int. Cl.⁵ .................................... G02F 1/133
[52] U.S. Cl. .................................. 350/332; 350/336
[58] Field of Search ................... 350/336, 333, 332

[56] References Cited

U.S. PATENT DOCUMENTS

| | | | |
|---|---|---|---|
| 4,113,361 | 9/1978 | Nakano | 350/336 |
| 4,256,376 | 3/1981 | Kobayashi et al. | 350/336 |
| 4,323,893 | 4/1982 | Ypsilantis et al. | 350/336 |

FOREIGN PATENT DOCUMENTS

| | | |
|---|---|---|
| 1302645 | 1/1973 | United Kingdom . |
| 2001468 | 1/1979 | United Kingdom . |
| 2052825 | 1/1981 | United Kingdom . |
| 2088612 | 6/1982 | United Kingdom . |

Primary Examiner—Stanley D. Miller
Assistant Examiner—Anita Pellman Gross
Attorney, Agent, or Firm—Remy J. VanOphem

[57] ABSTRACT

A liquid crystal alphanumeric display character is disclosed which includes a central liquid crystal display element. The display character is multiplex-driven and is connected to a plurality of segment lines and a plurality of common lines in a plurality of groups. Provision of the central element allows the segment and common lines to address the display without any of the segment lines having to cross any of the common lines.

14 Claims, 2 Drawing Sheets

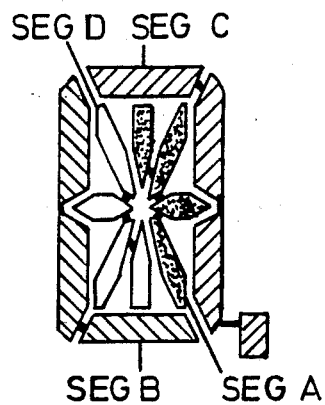
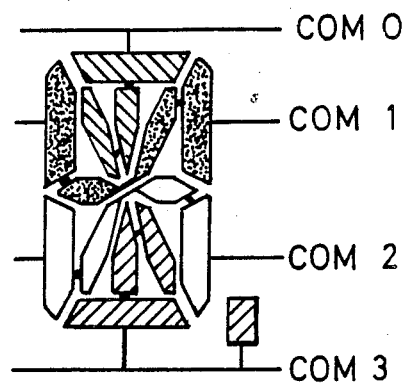
*Fig-1(a)*     *Fig-1(b)*
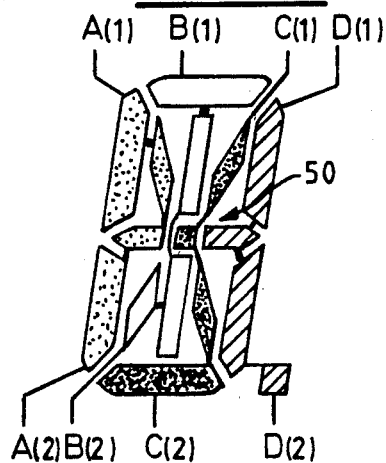
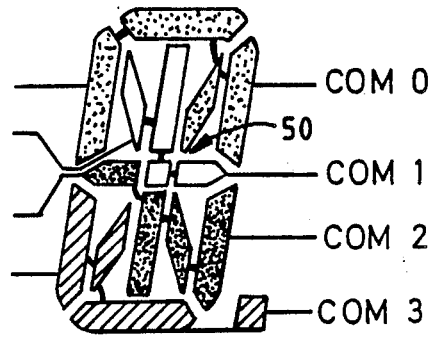
*Fig-2(a)*     *Fig-2(b)*
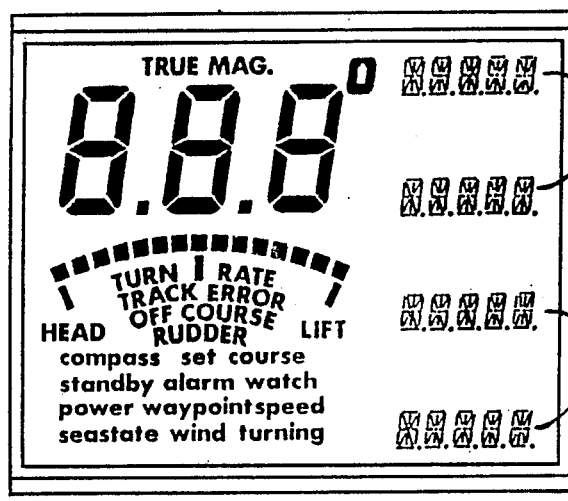
*Fig-3*

Fig-4(a)
Fig-4(b)
Fig-4(c)
Fig-4(d)
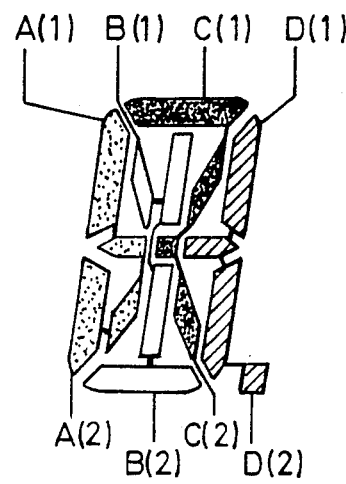
Fig-5(a)
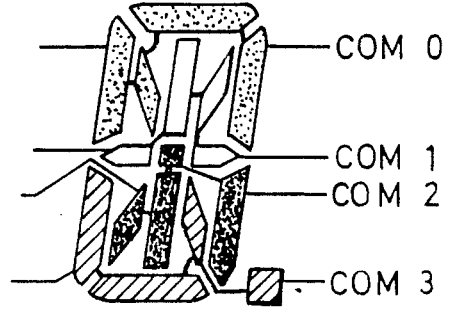
Fig-5(b)

DISPLAY CHARACTER

FIELD OF THE INVENTION

This invention relates to a display character.

Liquid crystal display characters for forming numeric, and alphanumeric character forms are known. Such display characters include first and second pluralities of electrodes arranged in a defined format, for example a "starburst" alphanumeric character, with a layer of liquid crystal material being disposed between the first and second pluralities of electrodes. A display element is formed by the combination of a first and an opposed second electrode. When opposed voltages are applied across the opposed electrodes the liquid crystal portion between the electrodes will change state from being transparent to being opaque so that, if a number of first and second electrodes are activated together, a desired alphanumeric figure may be formed. Examples of such figures are illustrated in FIGS. 4(a) and 4(c).

While it is possible to drive each electrode individually (direct drive), for complicated arrays of characters it is preferable to use a multiplexed drive as shown as in FIGS. 1(a) and (b), as is well known in the art, in which the electrodes of the first or second pluralities are joined together in groups, each group being connected to a common line, or a segment line respectively, such that each liquid crystal "portion" has a unique relationship with one common and one segment line. Then, the application of opposed voltages to a predetermined common line and to a predetermined segment line will uniquely specify one pair of opposed electrodes which will then cause the liquid crystal "portion" therebetween to change state. A suitable arrangement is shown in FIGS. 1(a) and 1(b), with the elements being connected in groups (shown by different shading) to common lines COM 0-COM 3 and segment lines SEG A-SEG D.

In use, the common lines are activated sequentially, with the segment lines being activated concurrently with the common lines to change the state of the desired segments. This operation is performed continuously, at high speed, so as to give the effect, to the human eye, of a direct driven display.

However, the alphanumeric display character as shown in FIGS. 1(a) and 1(b) has several disadvantages.

With reference to FIGS. 1(a) and 1(b), the segment lines are constrained to enter the display character from particular parts of the display, if the relative proportions of the gaps between the electrodes are to be substantially the same. In particular, segment line D can only come from the top of the display and segment line A can only come from the bottom of the display. Segment lines B and C can either come from the top or the bottom of the display. This creates a first disadvantage that it is difficult to place more than one line of regular shaped LCD characters on a display, as the tracking of those segment lines which need to be connected to the display characters at a position between the lines of the display characters (e.g. segment line A of a higher line of characters and segment line D of lower line of characters) cannot be tracked to the boundary of the LCD display, without a substantial gap between the lines of characters being provided.

More importantly, with this design of display character there will always be cross-over points between common line 0 and segment line D (and B if this comes from the top of the display) and common line 3 and segment line A. These cross-over points may cause dots to appear on the display, when lines 3 and A are activated together, for example, and are usually hidden outside the viewing area. However, if anything other than a single line of characters is employed, it is impossible to hide such unsightly blemishes.

SUMMARY OF THE INVENTION

It is an object of the invention to provide an alphanumeric display character which alleviates such problems.

According to the invention in a first aspect there is provided a liquid crystal alphanumeric display character having a plurality of liquid crystal elements. The elements include a central element, a first plurality of elements diverging from the central element and a second plurality of elements surrounding the first plurality of elements.

According to the invention in a second aspect, there is provided a display having at least one multiplex drive alphanumeric display character having a plurality of display elements addressed by segment lines and common lines, the lines running to the boundary of the display and wherein the elements are arranged so that the elements are connected to the segment lines and common lines without any line of the segment lines needing to cross any line of the common lines in the region between each display character and the boundary of the display.

According to the invention in a third aspect, there is provided a multiplex driven alphanumeric display character having a plurality of display elements addressed by segment lines and common lines and wherein all of the segment lines enter the display character at a first side of the character and all of the common lines enter the display character at a second, different side thereof..

BRIEF DESCRIPTION OF THE DRAWINGS

An embodiment of the invention will not be described, by way of example, with reference to the accompanying drawings, in which:

FIGS. 1(a) and 1(b) illustrates a known alphanumeric display character;

FIGS. 2(a) and 2(b) illustrates the embodiment of an alphanumeric display character of the invention;

FIG. 3 is an example of a display constructed using the character shown in FIGS. 2(a) and 2(b);

FIGS. 4(a) through 4(d) illustrates some figures which may be formed using, in FIGS. 4(a) and 4(c), the character as shown in FIGS. 1(a) and 1(b) and, in FIGS. 4(b) and 4(d), the character of the described embodiment of the invention of FIGS. 2(a) and 2(b); and FIGS. 5(a) and 5(b) illustrate a second embodiment of the invention.

DESCRIPTION OF THE PREFERRED EMBODIMENT

An embodiment of the invention will not be described with reference to FIGS. 2(a) and 2(b) of the accompanying drawing. The display character of FIGS. 2(a) and 2(b) differs, essentially, from the character of FIGS. 1(a) and 1(b) of the prior art in that a further display element 50 is provided as a "dot" in the center of the character.

Also, the elements are connected, to the segment lines A-D and to the common lines 0-3 in different groups, as shown, each group being shown by different shading.

Placing the extra element as a "dot" in the center of the character results in the following advantages being achieved:

1. That the segment lines A, B, C and D can either enter the character from the top or from the bottom thereof (or any combination of these).

2. Wherever segment lines emerge from the display character there need never be any cross-over points.

3. If required the common lines may be run vertically and the segment lines horizontally (by effectively changing the function of the lines A, B, C, D and the lines 0, 1, 2, and 3.

The addition of the central element does not require any further multiplexing lines, in comparison with the prior art, as in the prior art only fifteen elements are used. The addition of the sixteenth element, as shown in the described embodiment, uses the full multiplexing capability of the four segment lines and the four common lines.

Also, the extra segment improves a large number of improved character forms as can be seen by comparison of FIGS. 4(a) and 4(c) and FIGS. 4(b) and 4(d). The characters shown in FIGS. 4(a) and 4(b) are those which are most commonly thought to be poor to read, in particular the three vowels A, E and I. As can be seen, the inclusion of the central dot substantially improves the readability of these characters.

With the display character as shown in FIG. 2, the display, as for example shown in FIGS. 2(a) and 2(b), may be constructed without any unsightly blemishes, caused by the crossing of common lines and segment lines and also a plurality of lines of characters may be connected together on close proximity, as all the segment lines from lines 100 may come out of the top, or from lines 200, the bottom of the display.

While one embodiment of the invention has been illustrated, this is not to be construed as limitative and it will be appreciated by those skilled in the art that other configurations may be employed, for example mirror image and inverted forms. An example of such an alternative configuration is shown in FIGS. 5(a) and 5(b).

While the described embodiments have a central element, this may be omitted (a segment line will cross a common line at the center of the character which will produce a "dot" at the center of the display character but, as will be apparent from FIGS. 4(a) through 4(d), this will enhance rather than detract from the legibility of the character.

I claim:

1. A display having a plurality of multiplex drive alphanumeric display characters, each display character having a plurality of display elements addressed by segment lines and common lines, said segment and common lines running to the boundary of said display, each display character of said plurality of display characters comprising a central display element, a first plurality of display elements diverging from said central display element in a plurality of directions which cross each other at said central display element, and a second plurality of display elements surrounding said central and said first plurality of display elements, and wherein said central, said first plurality, and said second plurality of display elements are connected to said segment lines and common lines without any of said segment lines crossing any of said common lines in the region between said plurality of multiplex drive alphanumeric display characters and the boundary of said display.

2. A display as claimed in claim 1 wherein said second plurality of display elements form a generally rectangular shape.

3. A display as claimed in claim 2 wherein the elements of said first plurality of display elements lie between said central display element and the corners and mid-point of each side of said rectangle.

4. A display as claimed in claim 3 further comprising a further said element disposed outside the region surrounded by said second plurality of display elements.

5. A display as claimed in claim 1 wherein said second plurality of display elements comprises six elements.

6. A display as claimed in claim 1 wherein said first plurality of display elements comprises eight elements.

7. A display as claimed in claim 1 wherein said elements comprise first and second pluralities of electrodes and a layer of liquid crystal material disposed between said pluralities of electrodes, each plurality of electrodes being divided into a plurality of groups, each group of said first plurality of electrodes being addressed by a said segment line and each group of said second plurality of electrodes being be individually addressed by a said segment line and a said common line.

8. A display as claimed in claim 7 wherein said first and second plurality of electrodes are each divided into four said groups.

9. A display as claimed in claim 1 wherein all said segment lines enter said display characters at a first side thereof and all said common lines enter said display characters at a second, different side thereof.

10. A display as claimed in claim 9 wherein said segment lines exit said display characters at a third side thereof and said common lines exit said display characters from a fourth side thereof, said first and third sides being opposite one another.

11. A display as claimed in claim 9 wherein said first and second sides are normal to one another.

12. A display as claimed in claim 1 wherein said characters are arranged in a plurality of lines adjacent to one another.

13. A liquid crystal alphanumeric display character comprising a plurality of liquid crystal elements, said plurality of liquid crystal elements including a central element, a first plurality of elements diverging from said central element, and a second plurality of elements surrounding said first plurality of elements, said second plurality of elements forming a generally rectangular shape and wherein said elements of said first plurality of elements lay between said central element and the corners and mid-point of each side of said rectangular shape.

14. A display character as claimed in claim 13 wherein said central, said first and said second plurality of elements comprise first and second respective pluralities of electrodes and a layer of liquid crystal material disposed between said first and second pluralities of electrodes, each plurality of electrodes being divided into a plurality of groups, each groups of said first plurality of electrodesw being addressed by a said segment line and each groups of said second plurality of electrodes being addressed by a said common line whereby each element may be individually addressed by a said segment line and a said common line.

* * * * *

UNITED STATES PATENT AND TRADEMARK OFFICE
CERTIFICATE OF CORRECTION

PATENT NO. : 4,932,756

DATED : June 12, 1990

INVENTOR(S) : David J. Spicer

It is certified that error appears in the above-identified patent and that said Letters Patent is hereby corrected as shown below:

Column 1, line 2, delete "FIELD OF THE INVENTION" and insert at the left margin ---- BACKGROUND OF THE INVENTION ----.

Column 2, line 38, delete "An".

Column 2, line 39, insert a paragraph indention, same line, before "embodiment" insert ---- An ----, same line, delete "not" and insert ---- now ----.

Column 2, line 41, delete the indention.

Column 2, line 57, before "DESCRIPTION" insert ---- DETAILED ----.

Column 2, line 59, delete "not" and insert ---- now ----.

Column 2, line 66, after "connected, delete the comma ",".

Column 3, line 4, delete "B." and insert ---- B, ----.

Column 3, line 29, delete "FIG. 2" and insert ---- FIGS. 2(a) and 2(b) ----.

Column 3, line 30, delete "FIGS. 2(a) and 2(b)" and insert ---- FIG 3. ----.

UNITED STATES PATENT AND TRADEMARK OFFICE
CERTIFICATE OF CORRECTION

PATENT NO. : 4,932,756

DATED : June 12, 1990

INVENTOR(S) : David J. Spicer

It is certified that error appears in the above-identified patent and that said Letters Patent is hereby corrected as shown below:

In the Claims

Column 4, line 24, after "being" insert ---- addressed by a said common line whereby each element may ----.

Column 4, line 41, after "said" insert ---- display ----.

Column 4, line 61, delete "groups" and insert ---- group ----.

Column 4, line 62, delete "electrodesw" and insert ---- electrodes ----.

Column 4, line 63, delete "groups" and insert ---- group ----.

Signed and Sealed this

Twenty-third Day of October, 1990

Attest:

HARRY F. MANBECK, JR.

*Attesting Officer*     *Commissioner of Patents and Trademarks*